Nov. 17, 1970   TOYOO SEGAWA ET AL   3,541,597

PLATE STACKING APPARATUS

Filed April 7, 1969   3 Sheets-Sheet 1

TOYOO SEGAWA and
HIROAKI ZAITA,

INVENTORS

BY *Wenderoth, Lind*

*and Ponack* ATTORNEYS

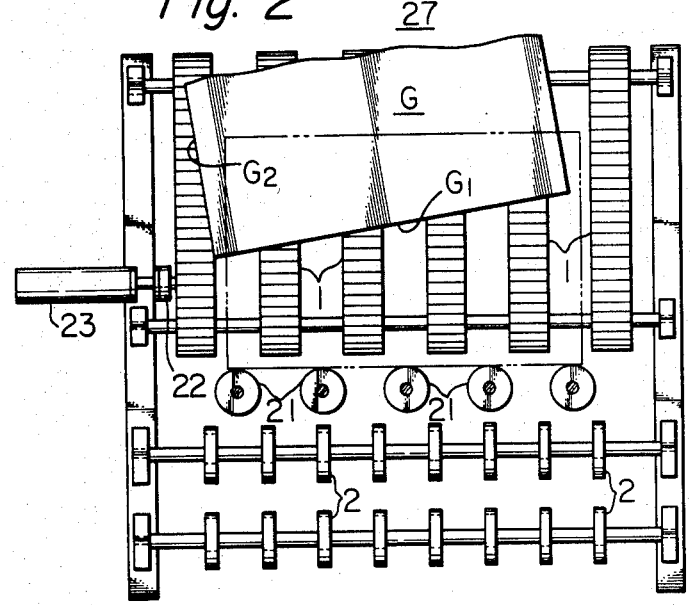
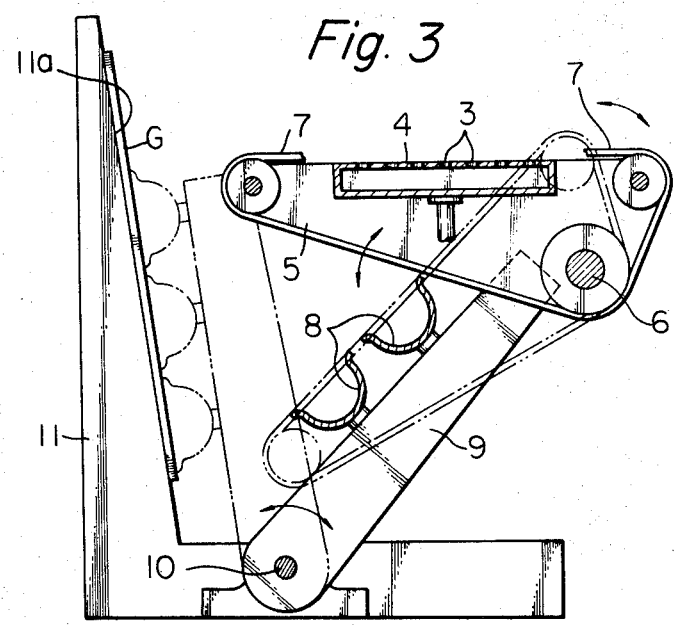

United States Patent Office 3,541,597
Patented Nov. 17, 1970

3,541,597
PLATE STACKING APPARATUS
Toyoo Segawa, Higashiosaka-shi, and Hiroaki Zaita, Ichihara-shi, Japan, assignors to Nippon Sheet Glass Co., Ltd., Osaka, Japan
Filed Apr. 7, 1969, Ser. No. 813,951
Claims priority, application Japan, Apr. 15, 1968, 43/25,456, 43/25,457, 43/30,981
Int. Cl. B65g 57/00; B65h 9/06
U.S. Cl. 214—7
3 Claims

ABSTRACT OF THE DISCLOSURE

An apparatus for stacking plates such as of glass, whereby the successive stacking of plates which have been transferred on and along a horizontal plane onto an inclined rack or horizontal base is performed by entirely mechanical operations without manual labor. A first rotatable support body which holds the plate transferred thereto by suction on the under-surface of said sheet is rotated to incline the plate downwardly and forwardly; the plate is relayed therefrom to a separate, second rotatable support body which also holds the under-surface of the plate by suction; and finally the second rotatable support body is rotated forwardly to transfer and stack the plate onto an inclined rack or horizontal base positioned ahead of said body, the foregoing series of operations being repeated to successively stack the plates at high speed.

---

Figure 1:
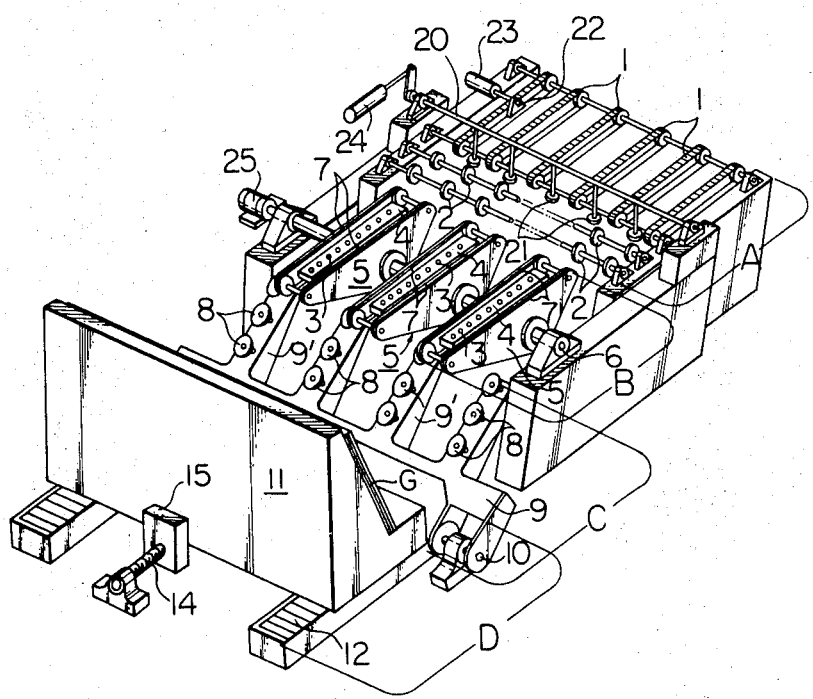

This invention relates to an improvement in an apparatus for transferring and stacking broad plates, such as metal plates, glass plates and plates of plastics. More particularly the invention relates to an improvement in the apparatus for transferring the plates from a position A to a position B and stacking them at a destination.

Recently produced plates, for example, sheet glass, have an increasingly larger size, e.g., as long as 3–4 meters on one side. Such large plate materials are extremely unwieldy to handle. Conventionally, successive stacking of plates, which have been transferred on a substantially horizontal plane, onto a rack or buck with an inclined supporting plane or horizontal base is effected by manual operation of workers, or by mechanical operation of a crane with a holding means, etc. The manual operation, however, if such is feasible for handling of small size plates, is entirely unsuitable for handling large size plates as referred to above. Even with the cooperation of several operators, the plates are liable to be marred or even actually broken. An apparatus employed for carrying out such stacking by a mechanical operation comprises, for example, a framework provided with a least two conveyor belts, plural support frames with their degrees of inclination freely variable, which are disposed in parallel in the framework, and plural vacuum or suction cups mounted on each support frame. The plates transferred onto the frame are held on the horizontally disposed support frames by means of suction with the vacuum cups, and thereafter the support frames are caused to rise to stack the plates against a rack position at the side of the frame opposite that from which the plates are initially transferred onto the frame.

This invention relates to an improvement in such known apparatuses. That is, the conventional mechanical apparatuses are subject to the following defects.

(1) When one of those successively transferred plates is positioned on the framework, the subsequent plates can no longer advance, but must wait in the rest positions until the plate on the framework is raised by the support frames, stacked, and the support frames return to the initial positions in the framework. This waiting time appreciably retards the stacking operation. In order to accelerate the operation, certain improvements are required in the transferring and raising devices for the plates.

(2) The plate transferred onto the framework does not always land in the same position. The correction or adjustment of the initial position has been heretofore manually effected. At least one operator is required for this purpose, and also such is another retarding factor of the plate stacking operation.

The present invention seeks to overcome the foregoing defects in the conventional practice, for markedly accelerating the transferring and stacking speed. The most notable feature of the invention resides in the two-stage performance of the transferring and stacking, i.e., the rise or inversion of each plate is effected in two steps. This makes it possible to more than double the transferring and stacking speed. Furthermore, the position of each plate is automatically corrected.

Accordingly, the object of this invention is to increase the operation speed of transferring and stacking plates, by employing a two stage system of mechanical operation.

Another object of this invention is to improve the efficiency, by automatically correcting the position of the plate being transferred.

Figure 4:
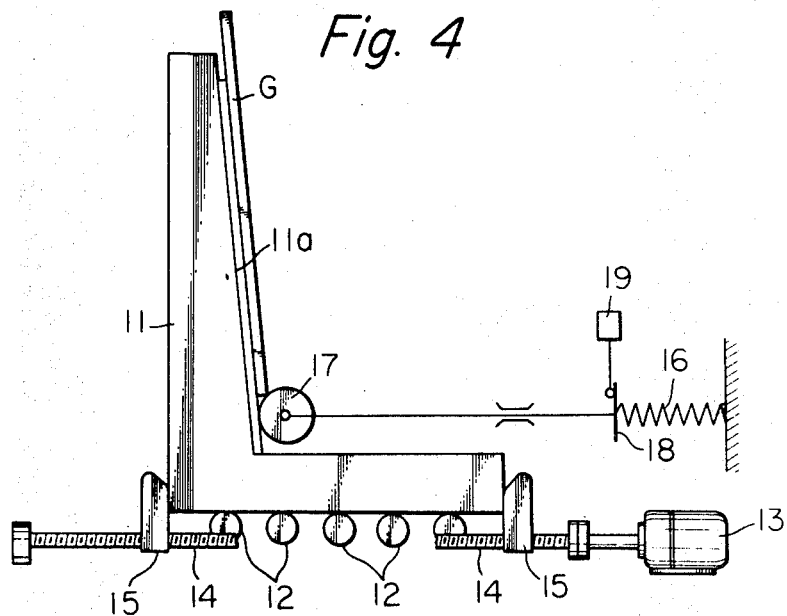
Figure 5:
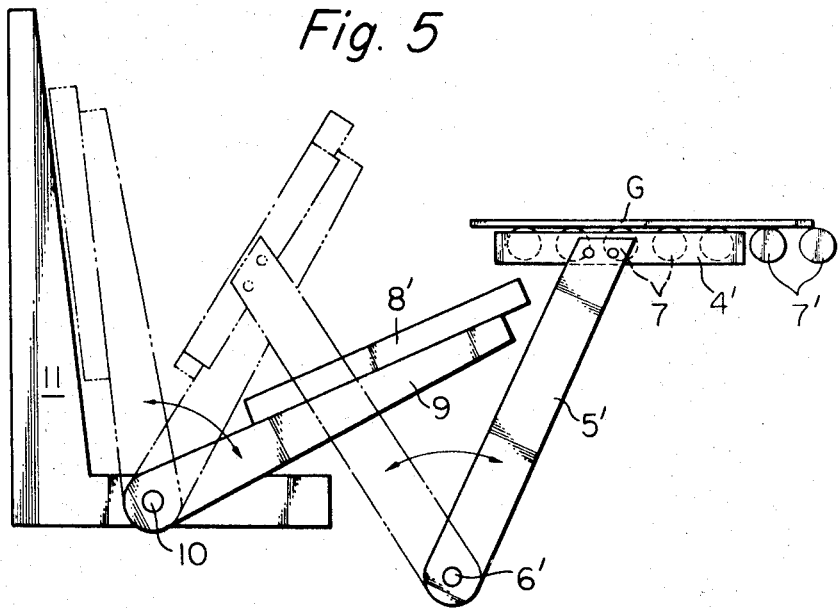

The attached drawings show a few embodiments of the plate transferring and stacking apparatus of this invention, in which:

FIG. 1 is a schematic perspective view of the apparatus as a whole,

FIG. 2 is a plan view of the part for correcting the position and posture of the plate being transferred, FIG. 3 is a schematic side elevation of the apparatus, showing the sequence of steps in the intermediate relaying of the plate, FIG. 4 is a schematic side elevation showing the sequence of steps in the final stacking of each plate, and FIG. 5 is a schematic side elevation of another embodiment, showing the sequence of steps in the intermediate relaying of a plate.

An embodiment of the invention will be explained in detail with reference to the attached drawings. First, as demonstrated in FIG. 1, the transferring and stacking apparatus can be divided into four parts A, B, C, and D, according to the sequential progress of the plate. In the part A the apparatus receives a plate and corrects its posture so that it is in a fixed position, and sends it to the next part B. In the part B the plate received is brought to a predetermined position in that part, and simultaneously suction boxes are applied to the under surface of the plate to provide a strong hold thereon. Then the part B itself revolves to give a sharp inclination to the plate in the forward direction of transfer. The part C receives the sharply inclined plate as it is, and while strongly holding the plate with vacuum cups, the part C revolves to press the plate against a vertically inclined wall in part D. The transferring and stacking operation of one plate is thus completed.

Now, each part will be described more fully. The part A forms a transferring path for the plates, comprising plural conveyor belts 1 disposed in parallel at predetermined intervals. The upper surface of each conveyor belt is to receive the plates and transfer the same in a predetermined direction. For correcting the position of a plate thereon, the correction can be effected with greater ease if the slidability between the plate and belt is good. Therefore, it is desirable to provide bristles or hair on the belt surfaces. Above the foremost ends of the belt conveyors thus disposed in parallel, plural stoppers 21 are suspended, which are fixed on the lower ends of rods downwardly extending from a transversely disposed rod 20. Each stopper is formed as a roller and is freely rotatable.

The rod 20 is rotatable by means of cylinder 24 provided at one end thereof. Thus, by slightly rotating the rod 20, the stoppers 21 suspended therefrom can be lifted or moved up. The stoppers 21, when not lifted, are so positioned that they come in contact with the front edge of the advancing plate, and thereby stop the advance of the plate. Upon completion of correction of the plate position, the stoppers 21 are lifted and the plate is allowed to freely progress. A pushing means 22 is separately provided in the part A, which moves forward and backward being driven by a cylinder 23. The forward end thereof contacts the side edge of the plate on part A, to effect the correction of the transverse position of the plate. In the direction of advance of belt conveyors 1, ring rollers 2 are provided, that is, plural rollers are mounted on a shaft at predetermined intervals. The rollers are freely rotatable. The ring rollers 2 function to support the plate delivered from belt conveyors 1.

Subsequently to the part A, a first rotatable supporter, part B, is provided in the direction of advance of the plate. In part B, plural support frames 5 disposed at regular intervals are mounted on a transverse shaft 6 extending through the lower ends of the frames. The part B is rotated by the revolution of said transverse shaft 6 which is driven by motor 25 connected to one end of the shaft 6, so that the top plane thereof is moved from its horizontal position to a forwardly and downwardly inclined position. The part B then is rotated in the opposite direction to restore the horizontal positions of its top plane. A pair of belt conveyors 7 are provided along the two sides of the top of each support frame 5, the horizontal position of the belt conveyors being on the same level with the tops of the ring rollers 2. The plate advancing while supported by the ring rollers 2 is received by the belt conveyors 7 which continue to transfer the plate to a fixed position on the top of the part B. Between each pair of the belt conveyors 7 disposed in parallel, a suction box 4 is provided, which applies suction to the under surface of the plate brought to the fixed position and holds the plate as it is. Thus, when the support-frames are forwardly and downwardly inclined, the plate is strongly held by the suction boxes and never falls off. The part C (second rotatable supporter), which works in concert with the foregoing part B is constructed as follows. As shown in FIGS. 1 and 3, plural arms 9' are fixed on a base frame 9 at fixed intervals. On each arm 9', plural vacuum cups 8 are provided. A shaft 10 is provided at a lower portion of the base frame 9, which is connected to a motor (not shown) so as to render the part C rotatable. Each arm 9' in part C is disposed in a space between support frames 5 of part B, so that no mutual interference of rotation between the parts B and C takes place. For example, as shown in FIG. 3, when the part B rotates to occupy the position indicated by the dotted line, the part C is at the position identified with full lines. The plate is held by the force of suction boxes 4 in part B, as well as by the vacuum cups 8 in part C. When the vacuum of the suction boxes 4 is then relieved, the plate is held by the vacuum cups 8 alone. Immediately thereafter the part C is rotated to transfer and stack the plate on a vertically inclined rack 11 in part D. Whereupon the part B is rotated to return it to its horizontal position. That is, the plate is relayed from part B to part C, while in its inclined posture. For this reason the transferring and stacking operation is performed with greater speed, compared with similar operations with single rotatable frame.

Finally an embodiment of part D is illustrated in FIG. 4. The front inclined surface 11a of a rack or leaning stand 11 is somewhat rearwardly inclined at the top. The rack 11 is movable forward and backward by means of the support rollers 12 provided at the bottom, and also by a pair of projecting pieces 15 which hold the rack 11 therebetween and are threaded onto a threaded shaft 14. The shaft 14 is driven by a motor 13, and upon its rotation the projecting pieces 15 are activated to move the rack in the desired direction. Also a roller 17 which is pressed against the inclined surface 11a of rack 11 by a spring 16, and a switch 19 which is turned on or off by the action of a member 18 working against the spring 16, are provided. This switch 19 is placed in the driving circuit of motor 13.

The sequence of operation of the described apparatus is as follows. As shown in FIG. 2, the plate G delivered on the transferring path 27 is transferred onto the hair-surfaced belt conveyors 1, and advanced toward the stoppers 21. The conveyors 1 move relatively to the plate G while slipping, and provide only the force to transfer the plate G towards the stoppers 21. Thus the front edge $G_1$ of plate G contacts with all the stoppers 21 and thereby the posture of plate G is properly corrected in the direction of advance. Simultaneously, a similar correction in the transverse direction is effected by pushing the side edge $G_2$ of plate G with the pusher 22. As aforesaid, the movement of the pusher 22 is controlled by the cylinder 23. Thus, the pusher 22 is advanced forwards, and the plate G is transferred to a predetermined position via one lateral edge thereof. The transverse movement of the plate G on the belt conveyor can be very easily effected due to the hair-covered surface of belt-conveyor 1.

The front edge of plate G the posture and position of which have been duly corrected, is blocked by plural stoppers 21. Upon lifting the stoppers 21 by cylinder 24, the plate G resumes its progress, and is delivered onto the horizontally positioned belt conveyors 7 by the ring rollers 2. Keeping the belt conveyors 7 activated during the delivery, the plate G can be placed at the fixed position on part B. Thereupon the conveyors 7 are stopped, and the suction boxes 4 are actuated. The plate G is strongly engaged with the support frames 5 and will not easily come off. Then the motor 25 is activated to rotate the shaft 6, to change the posture of plate G fixed on the support frames 5 to a forward inclination (the posture indicated by dotted line in FIG. 3). At that time the plate G covers the vacuum cups 8 on the arms 9' (indicated with full line) of part C. The vacuum in the suction boxes 4 is relieved, and the plate G is held by the suction force of vacuum cups 8 of part C instead. The part C is then rotated toward the rack 11, and when the plate G is superposed on the leaning surface 11a of rack 11, the suction force of the vacuum cups 8 is relieved. In the meantime, the part B is restored to the initial horizontal position, and part C also is rotated to return to the position indicated with full lines in FIG. 3.

As already described, while the base frame 9 is rotated to lean the plate G against the rack 11, the immediately following plate G can be transferred onto the suction boxes 4.

The plate G supplied onto the rack 11 along the latter's leaning surface 11A causes the roller 17 to move toward the spring 16 against the force of said spring, by a distance corresponding to the thickness of said plate G. Whereupon the member 18 turns on the switch 19 to close the circuit and activate motor 13. Consequently the threaded shaft 14 revolves to push away the rack 11 from part C, by the projecting pieces 15. That is, upon stacking one plate, the rack 11 is pushed away from the part C by a distance corresponding to the thickness of the sheet. Thus, the rotatable part C can always transfer and stack plates at the predetermined position.

The most characteristic feature of this invention resides in the combination of two rotatable frames 5 and 9 and provision of suction means and vacuum cups on each of the frames. Furthermore, as illustrated in FIG. 3, each plate G is relayed from the suction means 4 to vacuum cups 8. Neither of the suction means 4 and 8 ever disturbs the posture of plate G during the transfer, and each rotates around a respective fixed transverse shaft 6 or 10. Since in both cases the rotation locus is constant, the plate as supplied to the predetermined position is precisely adjusted to the posture optimum for stacking on the rack or stand, and transferred to the stacking section. Therefore, entirely automatic aligning and stacking of plates G can be easily effected. The most critical characteristics of the apparatus is that the alteration in posture and position of a plate G is separately effected by two different suction means 4 and 8, and the apparatus can be operated at a faster rate without any inconvenience, in correspondence to an accelerated plate supply cycle. That is, while the rotatable frame with vacuum cups 8 is supplying a plate to the stacking section, the other rotatable frame with sucking means 4 can receive another plate G. Thus compared with the known apparatus in which a single rotatable frame provided with suction means is used to effect transfer and stacking of plates, in the apparatus of this invention the time required for a similar operation is much shorter, because the section means 4 and 8 each performs only a very short step. More specifically, the time required is approximately one-half in the subject apparatus. Also when a single rotatable frame is used to effect all actions, its rotation axis is located on substantially the same plane with that of the entrance of the plates into the apparatus. When the frame is rotated around such axis, the plate is carried to a higher level. Consequently the stacking section also must be provided at a level higher than the floor level. This is rather inconvenient for plate handling, and as a whole increases the risk of the operation. According to the invention such inconvenience is completely eliminated.

It is permissible to replace the suction boxes 4 with plural vacuum cups, and the vacuum cups 8 with a suction box. When suction boxes are used, it is recommended that sealing material such as felt, etc. be applied around the suction surfaces of the boxes to insure the suction action.

In the foregoing embodiment, the means for transferring the plate G onto the suction boxes 4, i.e., belt conveyors 7, are mounted on the support frames 5. Whereas, as illustrated in FIG. 5, the transferring means 7' may be installed in the spaces by the suction boxes 4', so that the boxes 4' only may be rotated. In such an embodiment, the rotation shaft 6' is positioned at the lower front end of the suction boxes 4' and the boxes 4' need only be connected to the support frames 5' pivoted on the rotation shaft 6'. Also the second suction means 8' must be kept in a waiting position at a lower and more rearward location from the rotation locus of the forwardly inclining suction boxes 4'.

When the rack 11 is so designed to automatically recede by the distance corresponding to the thickness of stacked plates, as has been explained in the foregoing, still more efficient transfer and stacking operations can be effected.

We claim:
1. A plate transferring and stacking apparatus which comprises a first rotatable support body provided at the end portion of a substantially horizontal plate transferring path, in the direction of advance of the plate being transferred on said path, said support body being formed of at least one support frame which is mounted on a first rotatable transverse shaft extending through said frames at the lower portion thereof, said first rotatable support body furthermore being rotated by a power source connected to said first transverse shaft so that the flat top portion of said support body is downwardly inclined in a forward direction from a horizontal position and is then rotated in the opposite direction to restore flat top portion to the horizontal position; a transfer means provided at the upper portion of said first rotatable support body to receive the plate being transferred when the top of the first rotatable support body is in a horizontal position, and subsequently to transfer the plate to a predetermined position on said support body; a suction means disposed on the upper portion of each support frame forming the support body to hold the plate firmly on said support body by a suction force; a second rotatable support body to relay the plate to inclined position from the downwardly and forwardly inclined position of the first rotatable support body after rotation of the first transverse shaft, said second rotatable support body having a plurality of arms fixed on a base frame supported by a second rotatable transverse shaft, each arm being provided with suction means on the top thereof, said plural arms being movable in paths which do not interfere with the rotatory motions of the first support body, and said second rotatable support body initially being in a position to intimately contact its suction means with the under surface of the plate which is downwardly and forwardly inclined by the first rotatable support body, thereby receiving the plate from the first support body, and then rotating forwardly to transfer and stack the plate onto a stacking section, and upon completion thereof rotating in the opposite direction to return to the initial, inclined position.

2. The plate transfer and stacking apparatus as claimed in claim 1, which further comprises a transfer means provided in front of the plate transfer and stacking apparatus, for suitably adjusting the posture or position of plates before sending them into said apparatus, said transfer means comprising conveyor belts having hair-covered surfaces to facilitate the plate movement thereon; plural rotatable stoppers provided at the forward end portion of said transfer means, said stoppers contacting the front edge of plate being transferred to block the advance thereof as well as to adjust the position of advance of the plate, and upon completion of the adjustment the stoppers being lifted to permit plate advance; and a pushing means to correct the transverse position of the plate during correction of its position of advance.

3. The plate transfer and stacking apparatus as claimed in claim 1 wherein said first rotatable support is formed of a plurality of branch frames spaced at certain intervals and secured to said first rotatable transverse shaft extending through the lower part of each of said frames; said first rotatable transverse shaft being rotated by a power source connected thereto to incline a flat top portion of said first rotatable support downwardly in a forward direction from the horizontal position and then rotate it in the opposite direction to return the flat top portion to the horizontal position; a transportation means being mounted on both sides of each of said branch frames and a suction means being provided at the upper side of the branch frames and between the transportation means located at the sides thereof.

References Cited

UNITED STATES PATENTS

| 2,559,460 | 7/1951 | Peterson | 214—1 |
| 3,090,504 | 5/1963 | Britton et al. | 214—7 |

FOREIGN PATENTS

| 1,098,439 | 1/1961 | Germany. |

GERALD M. FORLENZA, Primary Examiner
R. J. SPAR, Assistant Examiner

U.S. Cl. X.R.
214—1; 271—58